(12) United States Patent
Fridman

(10) Patent No.: US 6,543,622 B1
(45) Date of Patent: Apr. 8, 2003

(54) PORTABLE CONVEYOR WITH SWIVEL AND FOLD

(75) Inventor: Boris Fridman, York, PA (US)

(73) Assignee: Terex Corporation, Westport, CT (US)

( * ) Notice: Subject to any disclaimer, the term of this patent is extended or adjusted under 35 U.S.C. 154(b) by 0 days.

(21) Appl. No.: 09/818,959

(22) Filed: Mar. 27, 2001

(51) Int. Cl.[7] .............................................. B65G 21/00
(52) U.S. Cl. ..................... 209/421; 209/420; 198/861.4
(58) Field of Search ................................. 209/420, 421, 209/284, 288, 293; 198/861.4, 861.6, 861.1, 586, 812, 632, 313, 861.5, 594

(56) References Cited

U.S. PATENT DOCUMENTS

| | | |
|---|---|---|
| 526,200 A | 9/1894 | Reid |
| 1,613,420 A | 1/1927 | Warr |
| 2,196,880 A | 4/1940 | Van Voorhis et al. |
| 2,734,730 A | 2/1956 | Talboys |
| 3,825,107 A * | 7/1974 | Cary et al. ................... 198/313 |
| 3,945,484 A * | 3/1976 | Oury ........................... 198/313 |
| 4,303,506 A * | 12/1981 | Finlay ......................... 209/247 |
| 4,834,463 A * | 5/1989 | Nye ............................ 299/39.2 |
| 4,983,280 A | 1/1991 | Eriksson |
| 5,097,610 A | 3/1992 | Bishop |
| 5,178,253 A * | 1/1993 | Fix .............................. 198/317 |
| 5,234,564 A * | 8/1993 | Smith ......................... 209/241 |
| 5,248,042 A | 9/1993 | Kuhmonen |
| 5,297,665 A | 3/1994 | Smith |
| 5,819,950 A | 10/1998 | McCloskey |
| 6,095,320 A * | 8/2000 | DeMong et al. ............ 198/812 |
| 6,283,697 B1 * | 9/2001 | Pierce et al. ................ 414/504 |
| 6,332,736 B1 * | 12/2001 | Cape et al. ................... 404/75 |
| 6,360,876 B1 * | 3/2002 | Nohl et al. .................. 198/588 |

FOREIGN PATENT DOCUMENTS

| | | | |
|---|---|---|---|
| CH | 674 197 A5 | * | 5/1990 |
| GB | 2 200 613 A | * | 8/1988 |

* cited by examiner

Primary Examiner—Donald P. Walsh
Assistant Examiner—Joseph C Rodriguez
(74) Attorney, Agent, or Firm—Theresa Fritz Camoriano

(57) ABSTRACT

A portable screen includes a conveyor which has a working position in which it extends out the end of the chassis, swivels, raises and lowers, and has a storage position in which it folds flat against the side of the chassis.

13 Claims, 11 Drawing Sheets

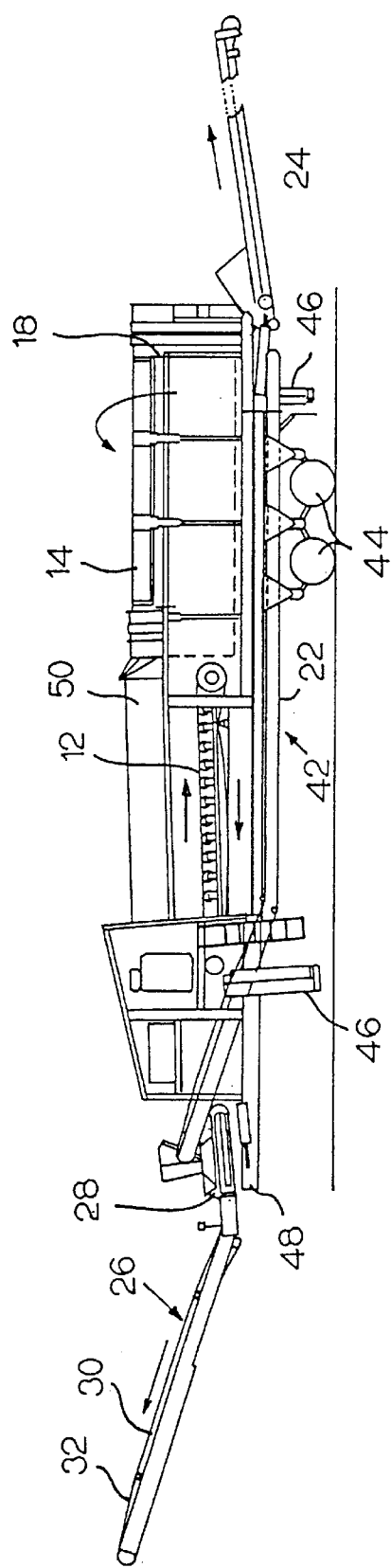
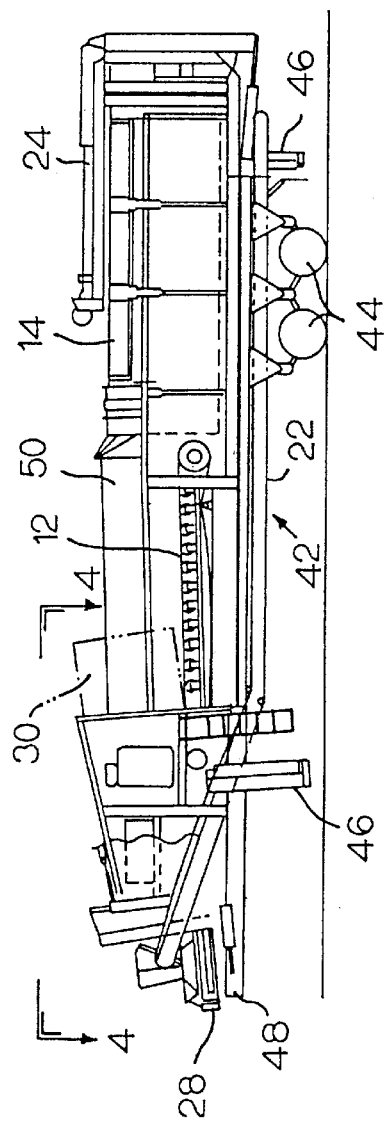
FIG. 2
FIG. 3

PORTABLE CONVEYOR WITH SWIVEL AND FOLD

BACKGROUND OF THE INVENTION

The present invention relates to portable conveyors which fold up for transport, and, in a preferred embodiment, to a portable screen with a swivel conveyor which pivots flat against the side of the chassis for transport.

Many types of portable conveyors are known, including swivel conveyors and conveyors which fold up for transport. However, the present design is more compact and reliable than many prior art products.

SUMMARY OF THE INVENTION

The present invention provides an improvement over the prior art by providing a rotating screen with a swivel conveyor that folds flat against the side of the chassis for transport. By folding flat against the side, this design is very compact.

BRIEF DESCRIPTION OF THE DRAWINGS

FIG. 2 is a side view of the machine of FIG. 1 with the conveyors fully extended;

FIG. 3 is a side view of the machine of FIG. 1 with the conveyors folded up for transport;

DESCRIPTION OF THE PREFERRED EMBODIMENT

Figure 1:
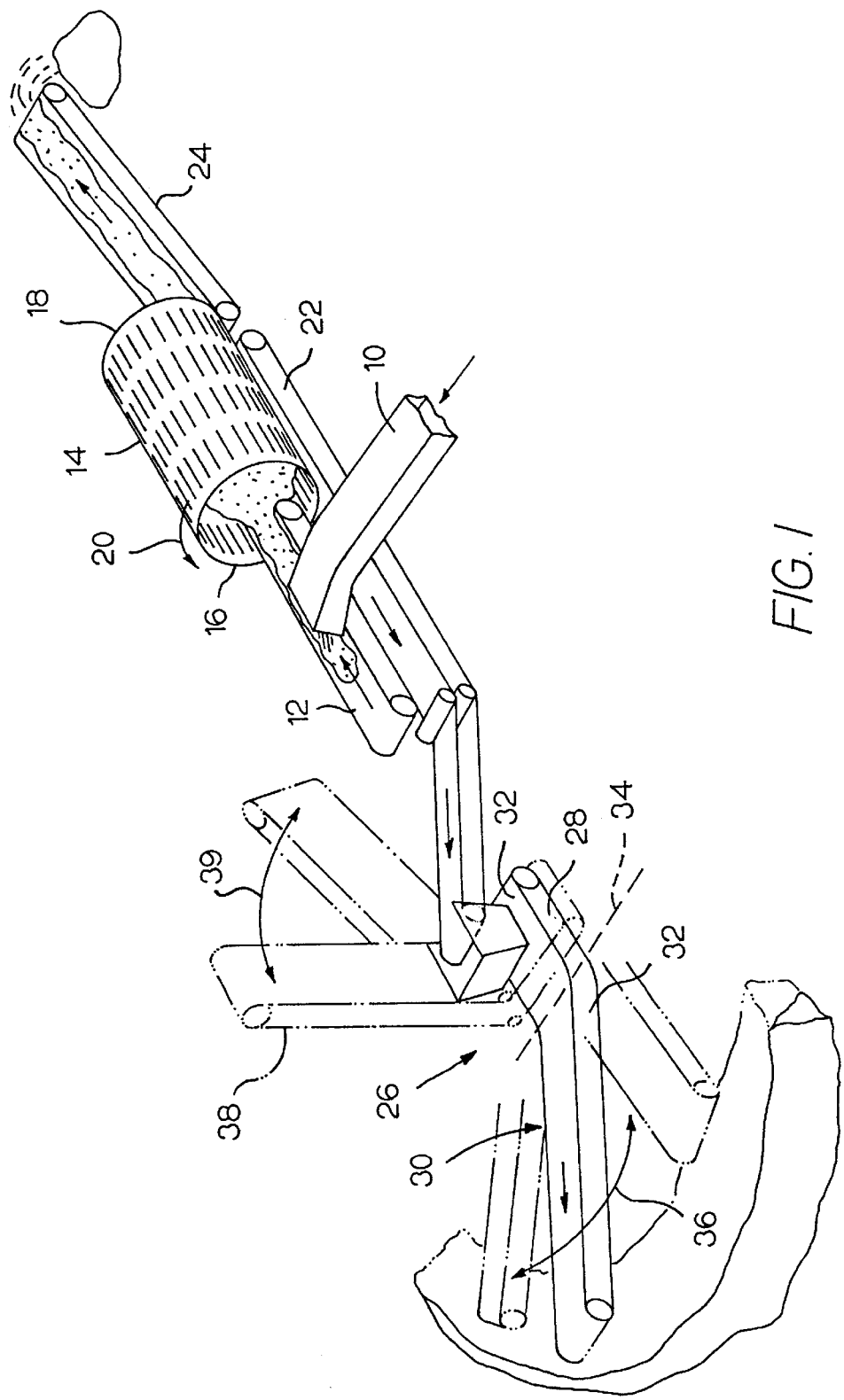
FIG. 1 is a schematic of a machine made in accordance with the present invention, with the chassis removed.

FIGS. 1–12B show a first preferred embodiment of a machine made in accordance with the present invention. FIG. 1 is a schematic view, which shows a device 10, which deposits unscreened material onto a feed belt 12, which carries the unscreened material to the interior of a rotating cylindrical screen 14, which, in the industry, is often called a trommel. The screen 14 is tilted at an angle, so that the first end 16, which receives the material from the feed conveyor 12 is at a higher elevation than the second end 18. As the screen 14 rotates about its axis, as shown by the arrow 20, finer material passes through the screen 14 and falls onto a fines conveyor 22 located below the screen 14. The material that does not pass through the screen 14 passes out the second end 18 of the screen 14 and falls onto an "overs" conveyor 24. The fines conveyor 22 carries the finer material toward the first end of the chassis (not shown) and deposits the material onto an output conveyor 26.

The output conveyor 26 includes a swivel portion 28 and an arm portion 30. A single conveyor belt 32 extends around the swivel portion 28 and arm portion 30. The swivel portion 28 swivels about a substantially vertical axis, traversing approximately 180 degrees. The arm portion 30 pivots about two different horizontal axes relative to the swivel portion 28. The first horizontal axis 34 extends cross-wise or perpendicular to the direction of travel of the belt 32 and permits the arm portion to be raised and lowered. In its normal operating position, the arm portion 30 is usually at an angle of at least 120 degrees from the swivel portion 28. The second horizontal axis 40 (see FIGS. 10, 12A, and 12B) is parallel to the direction of travel of the belt on the swivel portion 28, so it is at substantially right angles to the first horizontal axis 34. The rotation of the swivel portion 28 about a vertical axis permits the conveyor 26 to move left and right, as shown by the arrow 36 in FIG. 1. When the output conveyor 26 is to be folded up for storage, the arm portion 30 is raised to a substantially vertical position at approximately ninety degrees to the swivel portion, the swivel portion 28 is swivelled approximately ninety degrees to the right, to the position shown in phantom at 38 in FIG. 1, and the arm portion 30 is then pivoted about the second horizontal axis 40, following the path of the arrow 39 in FIG. 1 (the details are shown best in FIGS. 12A and 12B), to fold flat against the side of the chassis.

FIGS. 2 and 3 are more detailed schematics which show the working and storage positions of the machine, respectively. The machine is supported on a chassis 42, which is carried by wheels 44. The chassis also includes jack stands 46, which can be extended to provide support to the chassis. At the first end 48 of the chassis 42 is a trailer hitch, which permits the chassis 42 to be towed. A hopper 50 is centrally located on the chassis 42 and receives the unscreened material. The feed belt 12 is located at the bottom of the hopper 50 and carries the unscreened material to the interior of the cylindrical rotating screen 14. The "overs" (material that does not pass through the screen) fall out the second end 18 of the screen 14 and onto the "overs" conveyor 24. The fines fall through the screen 14 onto the fines conveyor 22, which deposits the fines onto the swivel portion 28 of the output conveyor 26. The belt 32 then carries the fines along the arm portion 30, and the fines then fall off the end of the arm portion 30.

As shown in FIG. 3, the arm portion 30 of the output conveyor 26 folds flat against the side of the chassis 42 for storage and transport, and the "overs" conveyor 24 folds up and over the top of the chassis 42 for storage and transport.

Figure 4:
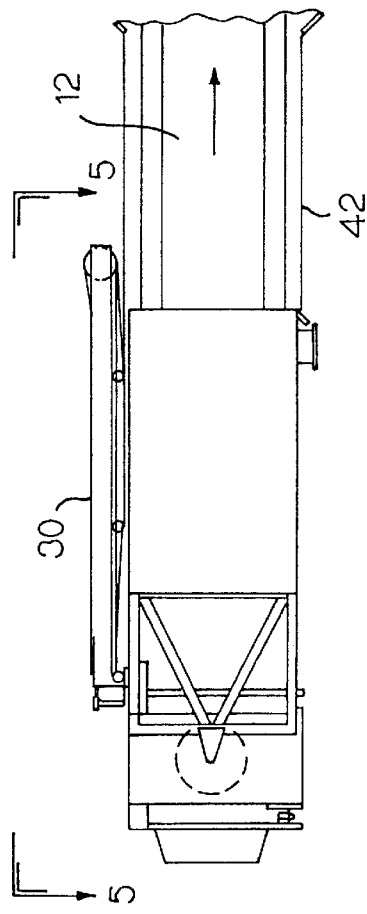
FIG. 4 is a view taken along the line 4—4 of FIG. 3.
Figure 5:
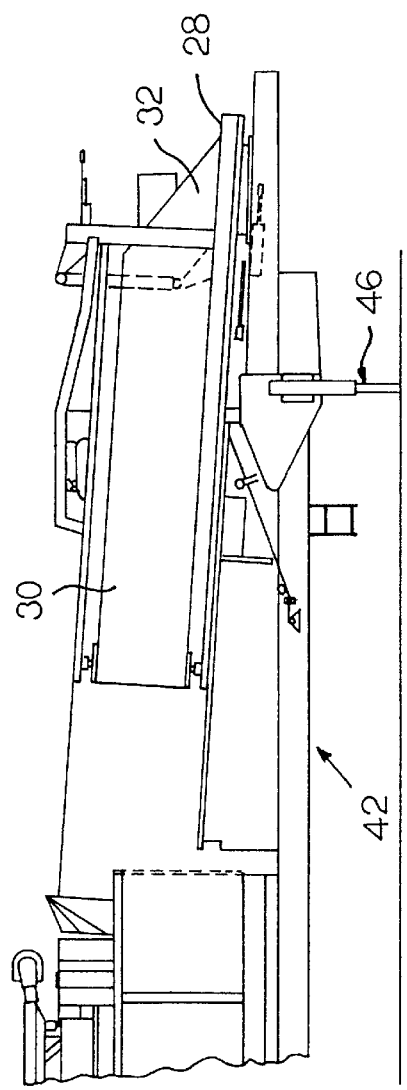
FIG. 5 is a view taken along line 5—5 of FIG. 4.

FIG. 4 is a top view, showing the arm portion 30 folded flat against the side of the chassis 42. FIG. 5 is a side view also showing the arm portion 30 folded flat against the side of the chassis 42.

Figure 6:
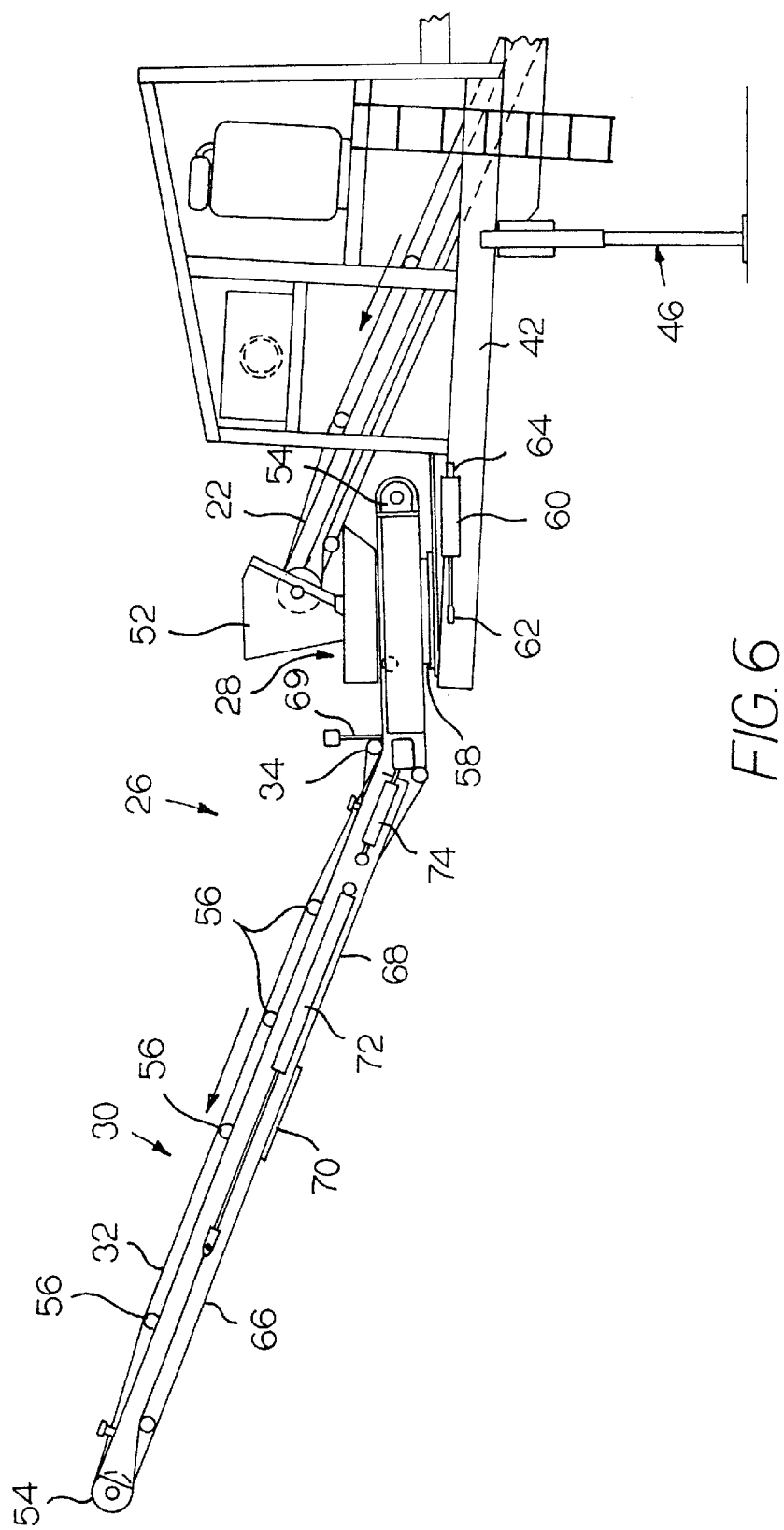
FIG. 6 is an enlarged side view of the left end of the machine of FIG. 2.
Figure 7:
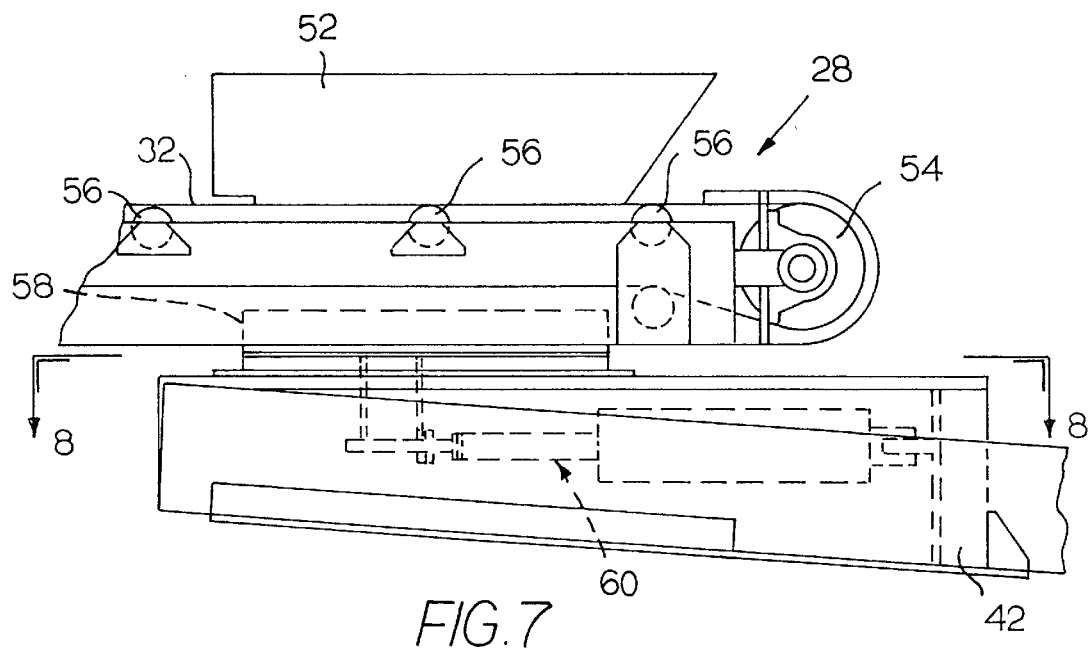
FIG. 7 is an enlarged side view of the swivel portion of the conveyor of FIG. 6.
Figure 8:
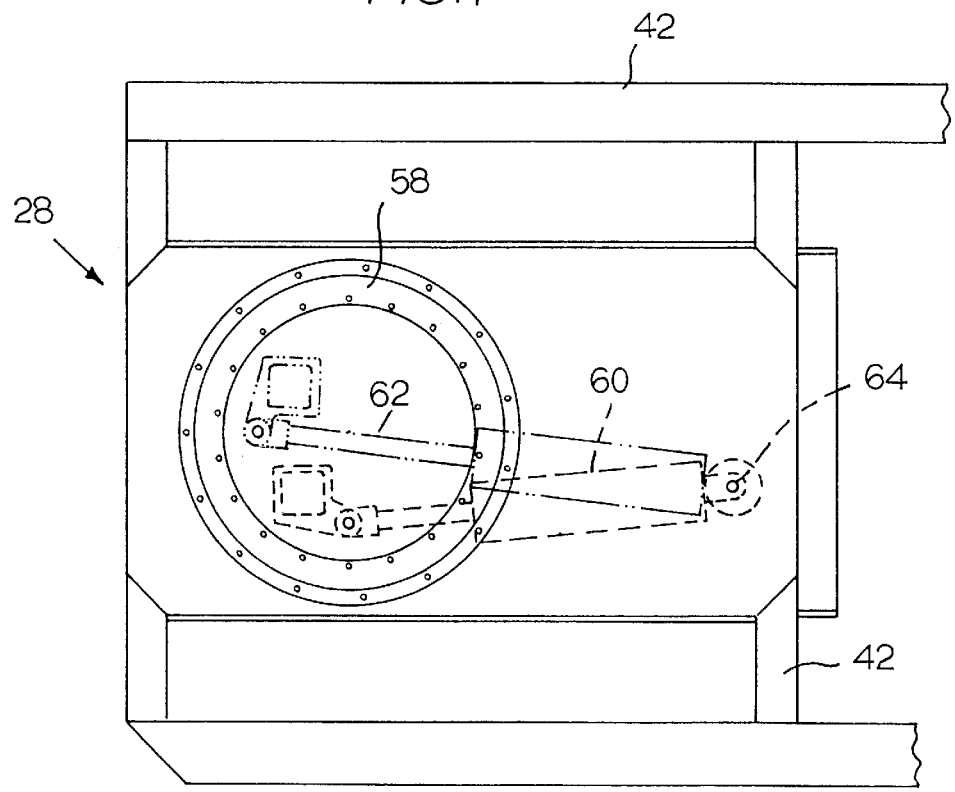
FIG. 8 is a view taken along the line 8—8 of FIG. 7.

FIGS. 6–8 show the output conveyor 26 in more detail. The fines conveyor 22 deposits the fine material onto the top of the swivel portion 28 of the output conveyor 26. A chute 52 surrounds three sides of the fines conveyor 22 at its output end in order to direct the material onto the output belt 32. The output belt 32 passes over two end pulleys 54, one located at the outermost end of the arm portion 30 and the other located at the innermost end of the swivel portion 28, at least one of the end pulleys 54 being driven. There are also numerous intermediate idler support rollers 56, which support the belt along its path. The pulleys 54 and rollers 56 are mounted on the frame of the output conveyor 26. The frame is in four main pieces. The first piece is the frame of the swivel portion 28 of the output conveyor 26, which is mounted on a turntable 58 that permits motion of the output conveyor 26 about a substantially vertical axis. A hydraulic cylinder 60 is pivotably and eccentrically mounted at one end 62 to the swivel portion 28 and at the other end 64 to the chassis 42 so that, as the piston extends and is retracted, it causes the swivel portion 28 to swivel. The extended position is shown in broken lines, and a partially retracted position is shown in solid lines in FIG. 8. The cylinder 60 is mounted so as to be able to cause the swivel portion 28 of the output conveyor 26 to swivel approximately 180 degrees, from a position in which the arm portion 30 extends out to the left of the chassis 42, to a position in which the arm portion 30 extends directly forward from the chassis 42, as shown in FIG. 6, to a position in which the arm portion 30 extends out to the right of the chassis 42.

The second, third, and fourth pieces of the frame of the output conveyor 26 are located in the arm portion 30. There is an outer frame portion 66 and an inner frame portion 68, and these two frame portions are guided in a guide 70, which keeps them aligned and coplanar as the outer frame portion 66 moves in and out relative to the inner frame portion 68. There is also a folding arm frame portion 69, shown best in FIGS. 12A and 12B. The folding arm frame portion 69 pivots relative to the swivel portion 28 about the horizontal axis 40, and the inner frame portion 68 pivots relative to the folding arm portion 69 about the horizontal axis 34.

Figure 9:
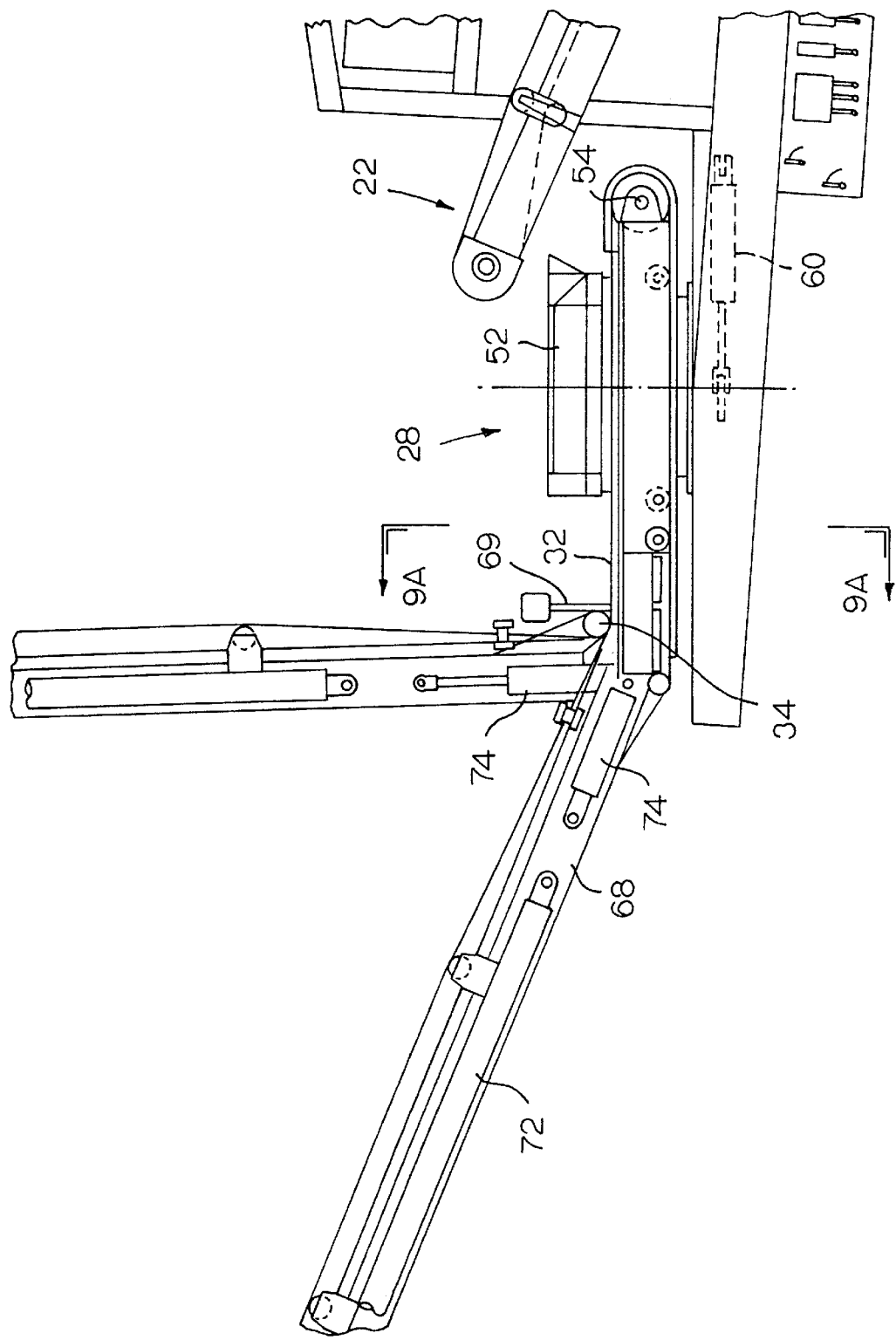
FIG. 9 is an enlarged view of a portion of the left conveyor of FIG. 6, showing the conveyor in two different positions, one extended and one vertical.

A pair of hydraulic cylinders 72 is located on the left and right sides of the arm portion 30 to extend and retract the outer frame 66 relative to the inner frame 68. A second pair of hydraulic cylinders 74 is located on the left and right of the arm portion 30 to raise and lower the arm portion 30, causing the arm portion 30 to pivot about the first horizontal axis 34. FIG. 9 shows that, when the cylinders 74 are extended, the arm portion 30 is raised, and when the cylinders 74 are retracted, the arm portion 30 is lowered about the first horizontal axis 34.

Figure 9A:
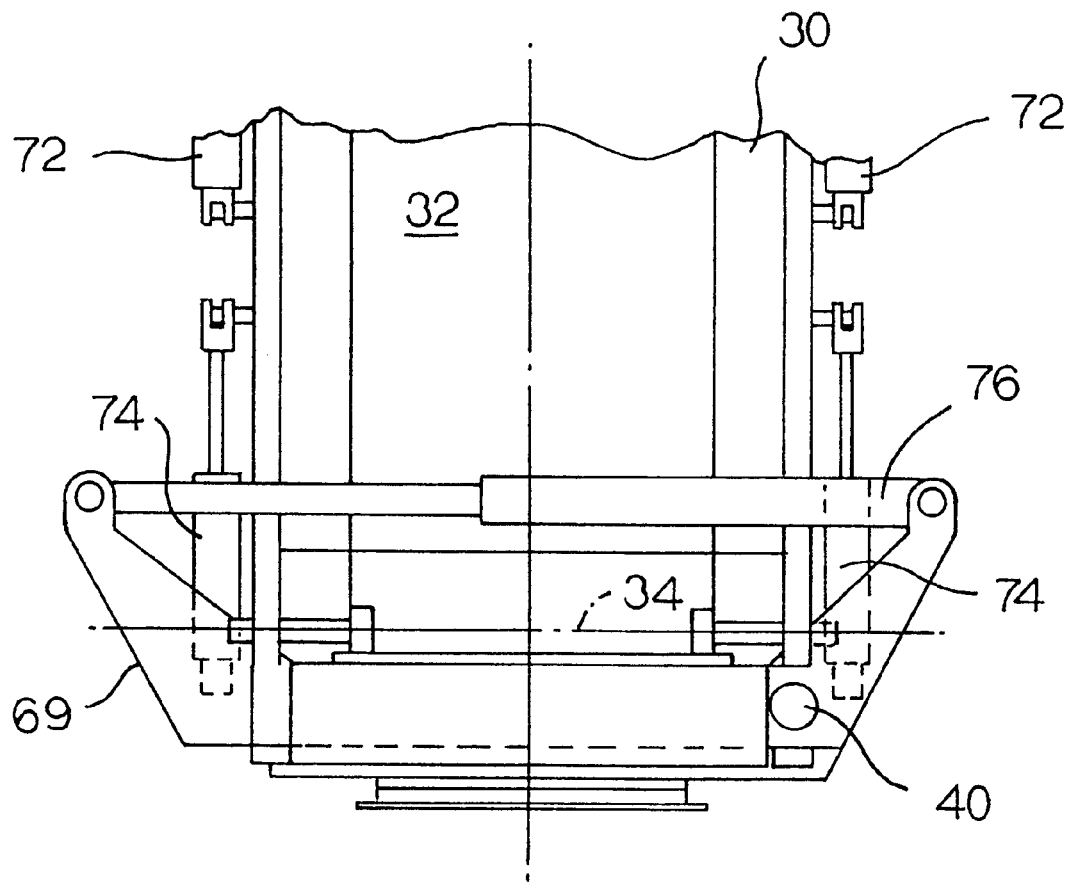
FIG. 9A is a view taken along the line 9A—9A of FIG. 9.

FIG. 9A is a view taken along the line 9A—9A of FIG. 9, showing the arm portion 30 in the raised position. It also shows another hydraulic cylinder 76 extending across the top of the belt 32 and secured to the folding frame portion 69. This cylinder 76 is used to fold the arm 30 over on its side, as will be explained later.

Figure 10:
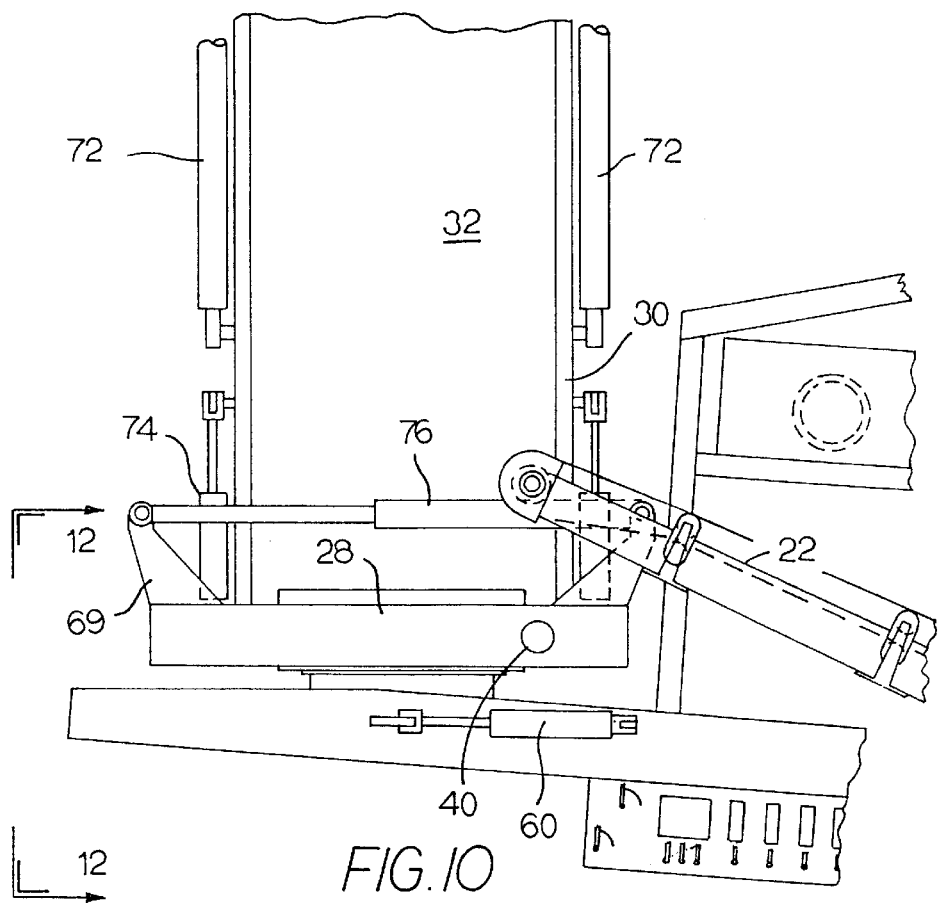
FIG. 10 is the same view as FIG. 9A but with more detail included and with the swivel portion 28 rotated ninety degrees.
Figure 11:
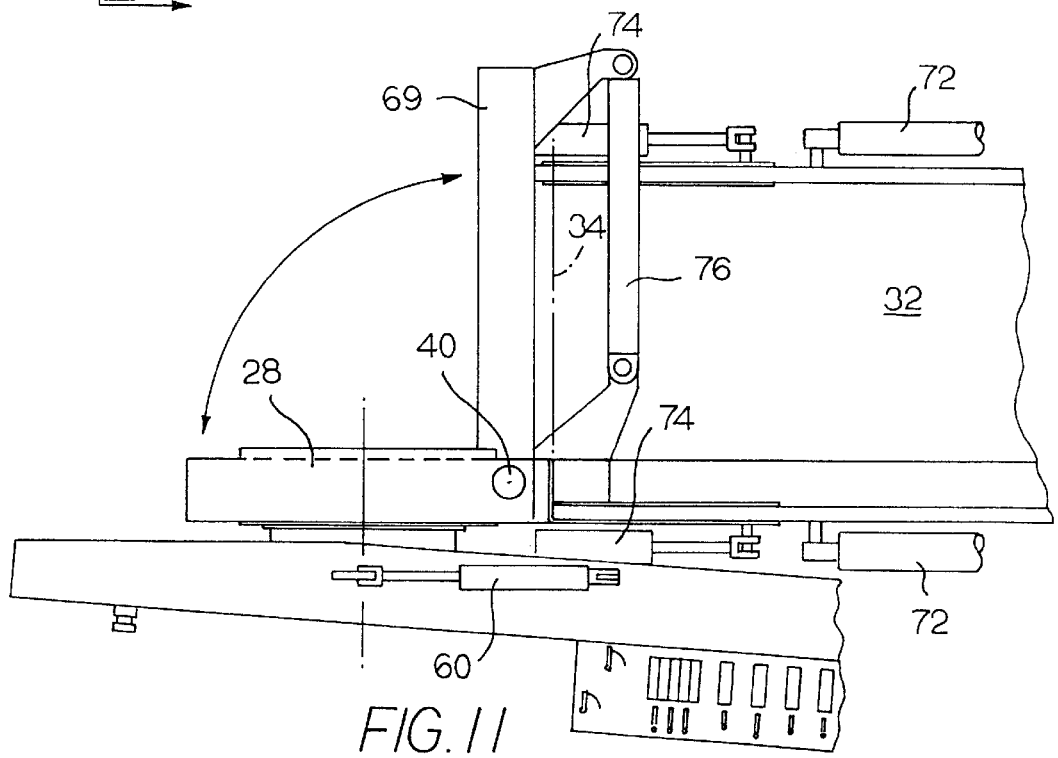
FIG. 11 is a view taken from the same direction as FIG. 10, after the conveyor arm has been folded to the side for transport.

In order to fold up the output conveyor 26 for storage or transport to the position shown in FIG. 3, the arm portion 30 is raised to a substantially vertical position as shown in FIGS. 9 and 9A by extending the cylinders 74. The swivel portion 28 is then pivoted around until the arm portion 30 is located on the left side of the chassis 42, by extending the cylinder 60, as shown in FIG. 10. The cylinders 72 are retracted to loosen the belt 32, and then the cylinder 76 is retracted, causing the arm portion 30 to fold over about the second horizontal axis 40 so that it lies flat against the side of the chassis 42, as shown in FIG. 11.

Figure 12:
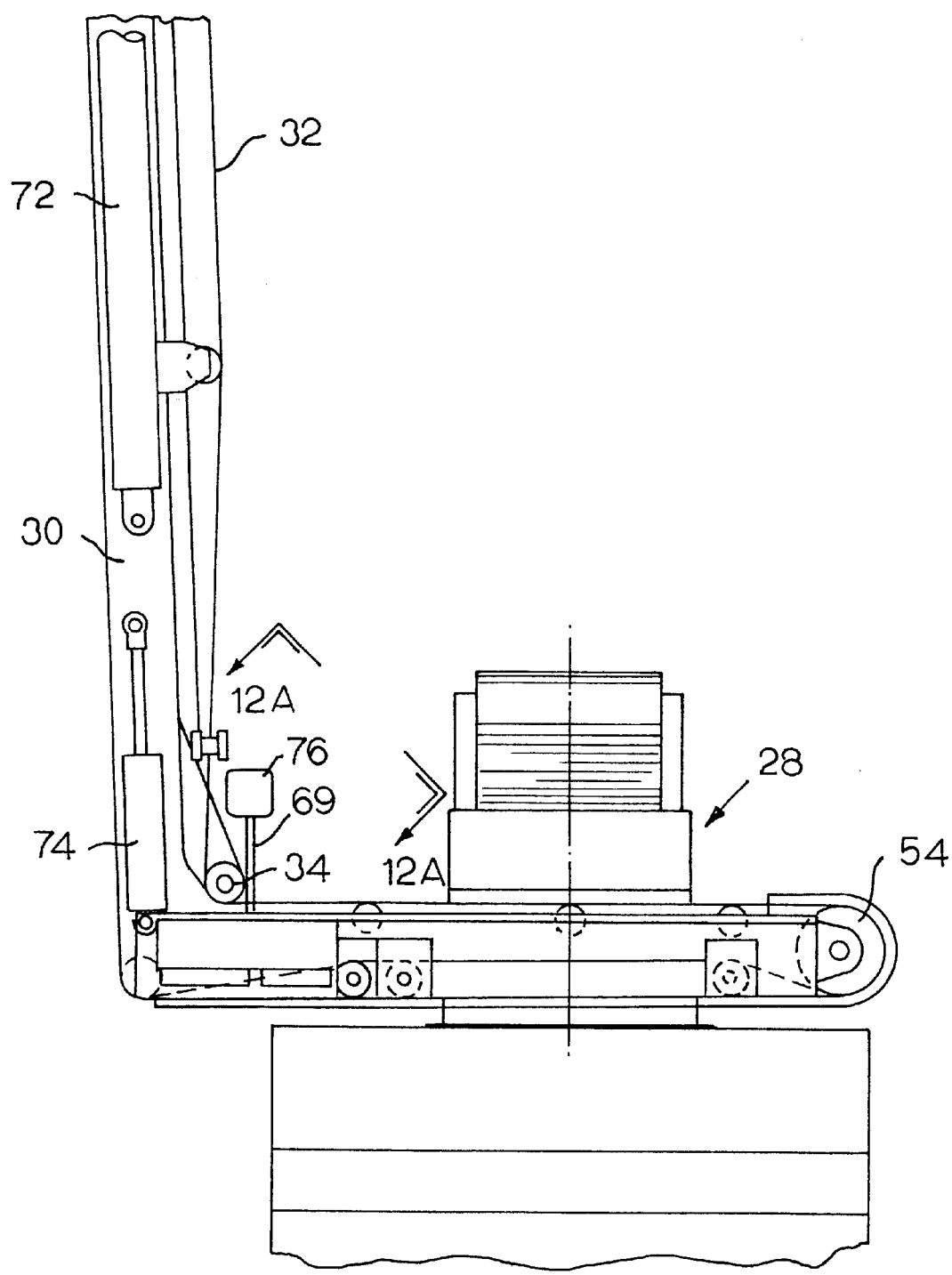
FIG. 12 is a view taken along the line 12—12 of FIG. 10.
Figure 12A:
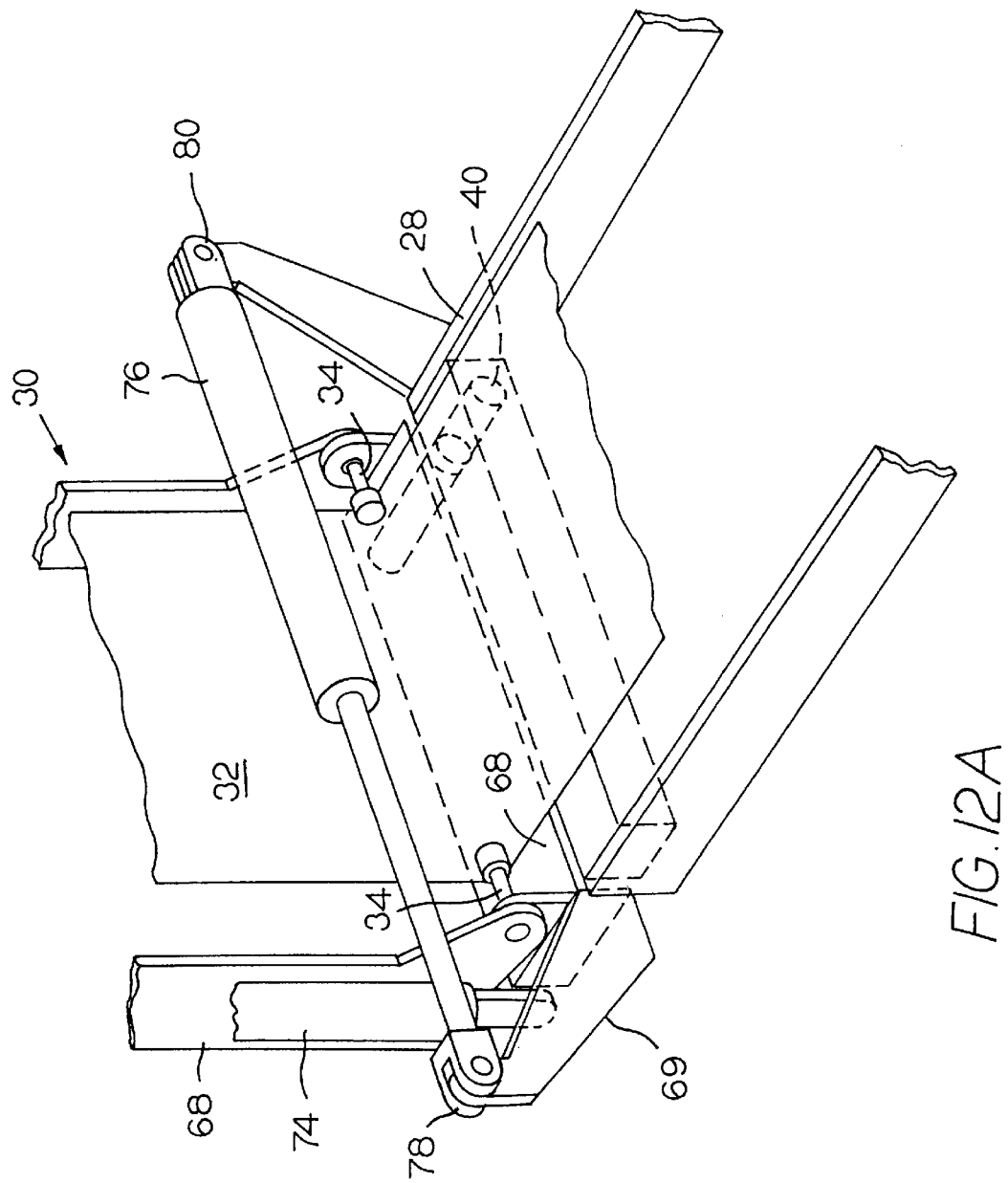
FIG. 12A is a view taken along the line 12A—12A of FIG. 12, with much of the detail removed.
Figure 12B:
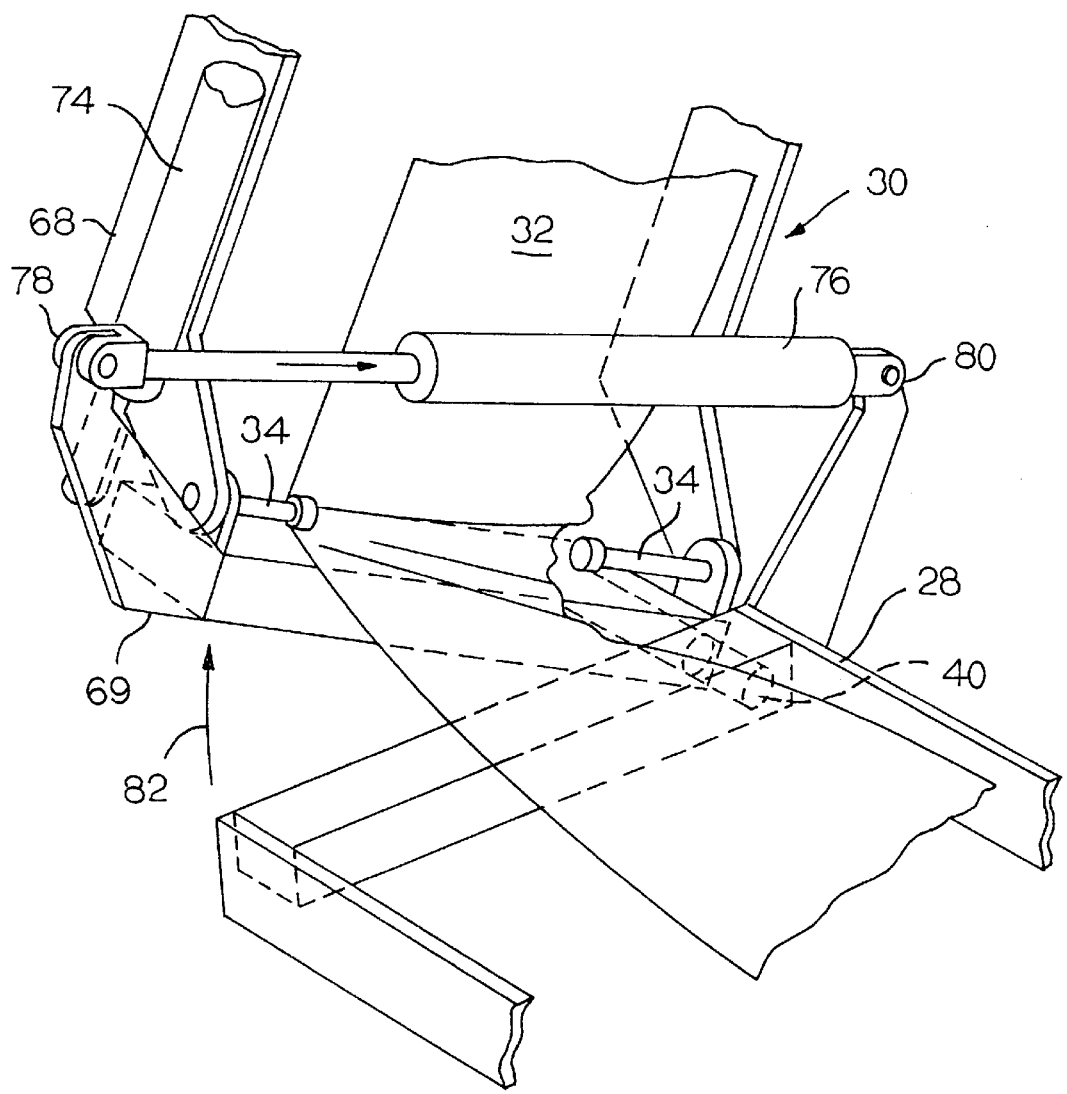
FIG. 12B is the same view as FIG. 12A but with the conveyor arm folding to the side for transport.

FIG. 12 shows the arm portion 30 in the position shown in FIG. 10. FIG. 12A is a perspective view showing the arm portion 30 in the position of FIG. 12, and FIG. 12B shows the arm portion 30 as it begins to fold over about the second horizontal axis 40. As the cylinder 76 retracts, as shown in FIG. 12B, it causes the belt 32 to begin folding over, as the arm portion 30 pivots about the second horizontal axis 40, folding the arm portion 30 flat against the side of the chassis 42. As shown in FIGS. 12A and 12B, the cylinder 76 is pivotably mounted at one end 78 to the folding frame portion 69 and at the other end 80 to the swivel frame 28 so that, as it retracts, it lifts the end 78, as shown by the arrow 82, rotating the arm portion 30 about the second horizontal axis 40.

It will be obvious to those skilled in the art that modifications may be made to the embodiment described above without departing from the scope of the present invention.

What is claimed is:

1. A portable screen, comprising:
   a chassis having a first end and a second end;
   a hopper mounted on the chassis;
   a screen mounted on the chassis and fed from the hopper;
   a fines conveyor located below the screen;
   a swivel conveyor mounted at said first end of the chassis, and including a conveyor belt defining a direction of travel, said swivel conveyor including a swivel platform portion which swivels about a vertical axis; and an arm portion mounted on said swivel platform portion, wherein said arm portion pivots about first and second horizontal axes relative to the swivel platform, said first horizontal axis being cross-wise to the direction of travel to permit the arm to raise and lower, and the second horizontal axis being parallel to the direction of travel, to permit the arm to fold flat against the side of the chassis for transport.

2. A portable screen as recited in claim 1, wherein said fines conveyor deposits material onto said swivel conveyor.

3. A portable screen as recited in claim 2, wherein said screen includes said fines conveyor, said swivel conveyor, an initial material transport conveyor which conveys material from the hopper to the screen, and an overs conveyor, which carries away the material that does not pass through the screen.

4. A portable screen as recited in claim 1, wherein said arm portion includes a lower arm portion and an upper arm portion and a guide which permits the upper arm portion to be extended and retracted relative to the lower arm portion for lengthening and shortening the arm portion.

5. A portable screen as recited in claim 4, and further comprising a first hydraulic cylinder, lying adjacent to a side of the arm portion, which controls the pivoting of the arm portion about said first horizontal axis.

6. A portable screen as recited in claim 5, and further comprising a second hydraulic cylinder which controls the pivoting of the arm portion about said second horizontal axis, said second hydraulic cylinder extending across the swivel conveyor.

7. A portable screen as recited in claim 6, and further comprising a third hydraulic cylinder which controls the rotation of the swivel platform.

8. A portable screen as recited in claim 7, wherein said screen is a cylindrical, rotating screen.

9. A portable screen as recited in claim 8, and further comprising a second conveyor which receives material leaving one end of the screen.

10. A portable screen as recited in claim 9, and further comprising a plurality of wheels supporting said chassis.

11. A portable screen as recited in claim 7, and further comprising a fourth hydraulic cylinder which controls the elongation and shortening of the conveyor arm portion.

12. A portable screen as recited in claim 11, wherein said conveyor includes a belt which conveys material along said swivel portion and along said arm portion, and wherein said belt folds when said arm portion is pivoted about said second horizontal axis.

13. A portable screen, comprising:
- a chassis having a first end and a second end;
- a hopper mounted on the chassis;
- a screen mounted on the chassis and fed from the hopper;
- a fines conveyor located below the screen;
- a swivel conveyor mounted at said first end of the chassis, and including a conveyor belt defining a direction of travel, said swivel conveyor including a swivel platform portion which swivels about a vertical axis; and an arm portion mounted on said swivel platform portion, wherein said arm portion pivots about first and second pivot axes relative to the swivel platform, said first pivot axis permitting the arm portion to raise and lower, and the second pivot axis being parallel to the direction of travel, to permit the belt to fold over and the arm portion to fold flat against the side of the chassis for transport;
- and further comprising a first hydraulic cylinder, which controls the pivoting of the arm portion about said first pivot axis; and
- a second hydraulic cylinder which controls the pivoting of the arm portion about said second pivot axis, said second hydraulic cylinder extending across the swivel conveyor.

* * * * *